(12) United States Patent
Banerjee et al.

(10) Patent No.: US 7,452,565 B2
(45) Date of Patent: Nov. 18, 2008

(54) IMMOBILIZATION OF BEAD-DISPLAYED LIGANDS ON SUBSTRATE SURFACES

(76) Inventors: Sukanta Banerjee, 4-I Lincoln Pl., North Brunswick, NJ (US) 08902; Hui Huang, 160 Birchview Dr., Piscataway, NJ (US) 08854

( * ) Notice: Subject to any disclaimer, the term of this patent is extended or adjusted under 35 U.S.C. 154(b) by 925 days.

(21) Appl. No.: 10/868,451

(22) Filed: Jun. 13, 2004

(65) Prior Publication Data

US 2005/0112277 A1 May 26, 2005

Related U.S. Application Data

(60) Provisional application No. 60/478,011, filed on Jun. 12, 2003.

(51) Int. Cl.
*B05D 3/00* (2006.01)
(52) U.S. Cl. ............... 427/2.1; 435/6; 435/7.1; 435/7.92
(58) Field of Classification Search ............... 427/2.1; 435/6, 7.92, 7.1
See application file for complete search history.

(56) References Cited

U.S. PATENT DOCUMENTS

| 5,208,111 | A | 5/1993 | Decher et al. |
|---|---|---|---|
| 2003/0082487 | A1 | 5/2003 | Seul |
| 2003/0082587 | A1* | 5/2003 | Seul et al. ............ 435/6 |
| 2003/0129296 | A1* | 7/2003 | Kelso ............ 427/2.1 |
| 2003/0138842 | A1* | 7/2003 | Seul et al. ............ 435/7.1 |
| 2004/0132122 | A1* | 7/2004 | Banerjee et al. ............ 435/7.92 |
| 2005/0048570 | A1* | 3/2005 | Weber et al. ............ 435/7.1 |

FOREIGN PATENT DOCUMENTS

EP  0 472 990 A2  4/1992

OTHER PUBLICATIONS

Cheng, J., et al. "Preparation and hybridization analysis of DNA/RNA from *E. coli* on microfabricated bioelectronic chips." *Nature Biotechnology*, Jun. 1998: 541-546, vol. 16.
Decher, G. "Fuzzy Nanoassemblies: Toward Layered Polymeric Multicomposites." *Science*, Aug. 29, 1997: 1232-1237. vol. 277.
Vasiliskov, A.V., et al. "Fabrication of Mircoarray of Gel-Immobilized Compounds on a Chip by Copolymerization". *BioTechniques*, Sep. 1999: 592-606. vol. 27.
Brown, Patrick O., et al. "Exploring the new world of the genome with DNA microarrays". *Nature Genetics Supplement*, Jan. 1999: 33-37. vol. 21.
Duggan, David J., et al. "Expression profiling using cDNA microarrys." *Nature Genetics Supplement*, Jan. 1999: 10-14. vol. 21.

(Continued)

*Primary Examiner*—Erma Cameron
(74) *Attorney, Agent, or Firm*—Eric P. Mirabel

(57) ABSTRACT

Disclosed are two different approaches for immobilization of beads on a substrate, one of which involves forming a bead-nanoparticle composite by cross-linking of the bead mixture with nanoparticles. The other method involves surface modification of the substrate, using multi-layered polyelectrolytes. With either method, the beads are immobilized on the substrate in a manner suitable for viewing, as when the beads are used in assays and need to be analyzed following the assay. Different designs of depressions are also disclosed, some of which are suitable for holding beads in place without any deposition of nanoparticles or polyelectrolytes.

16 Claims, 9 Drawing Sheets

OTHER PUBLICATIONS

Lipshutz, Robert J., et al. "High density synthetic oligonucleotide arrays." *Nature Genetics Supplement*, Jan. 1999: 20-24. vol. 21.

Cheung, Vivian G., et al. "Making and reading microarrays." *Nature Genetics Supplement*, Jan. 1999: 15-19. vol. 21.

Fodor, Stephen P.A., et al. "Light-Directed, Spatially Addressable Parallel Chemical Synthesis". *Science*, Feb. 15, 1991: 767-772, vol. 251.

Quon, R. A., et al. "Measurement of the Deformation and Adhesion of Rough Solids in Contact". *J. Phys. Chem. B*, 1999: 5320-5327, vol. 103.

Serizawa, Takeshi, et al. "Electrostatic Adsorption of Polystyrene Nanospheres onto the Surface of an Ultrathin Polymer Film Prepared by Using an Alternate Adsorption Technique". *Langmuir*, 1998: 4088-4094. vol. 14.

Kotov, Nicholas A., et al. "Layer-by-Layer Self-Assembly of Polyelectrolyte—Semiconductor Nanoparticle Composite Films". *J. Phys. Chem.*, 1995: 13065-13069. vol. 99.

Sennerfors, Therese, et al. "Adsorption of Polyelectrode-Nanoparticle Systems on Silica: Influence of Ionic Strength". *Journal of Colloid and Interface Science*, 2002: 222-226. vol. 254.

Lvov, Yuri, et al. "Alternate Assembly of Ordered Multilayers of $SiO_2$ and Other Nanopaticles and Polyions." *Langmuir*, 1997: 6196-6203. vol. 13.

Smay, James E., et al. "Colloidal Inks for Directed Assembly of 3-D Periodic Structures." *Langmuir*, 2002: 5429-5437. vol. 18.

Giorgi, Rodorico, et al. "Nanotechnologies for Conservation of Cultural Heritage: Paper and Canvas Deacidification." *Langmuir*, 2002: 8198-8203. vol. 18.

Crisp, M. Todd, et al. "Preparation of Nanoparicle Coatings on Surfaces of Complex Geometry." *Nano Letters*, 2003: 173-177. vol. 3, No. 2.

Hiller, Jeri'ann, et al. "Reversibly erasable nanoporous anti-reflection coatings from polyelectrolyte multilayers." *Nature Materials*, Sep. 2002: 59-63. vol. 1.

Ramsay, Graham. "DNA Chips: State-of-the-art". *Nature BioTechnology*, Jan. 1998: 40-44. vol. 16.

Maskos, Uwe, et al. "Oligonucleotide hybridizations on glass supports: a novel linker for oligonucleotide synthesis and hybridization properties of oligonucleotides synthesise *in situ*." *Nucleic Acids Research*, 1992: 1679-1684. vol. 20, No. 7.

Johnson, K.L., et al. "Surface energy and the contact of elastic solids." *Proc. R. Soc. Lond. A.*, 1971: 301-313. vol. 324.

Greenwood, J.A., et al. "The Elastic Contact of Rough Spheres". *Journal of Applied Mechanics*, Mar. 1967: 153-159.

Iler, R.K. "Multilayers of Colloidal Particles." *Journal of Colloid and Interface Science*, 1966: 569-594. vol. 21.

* cited by examiner

Fig 6A
Fig. 6B
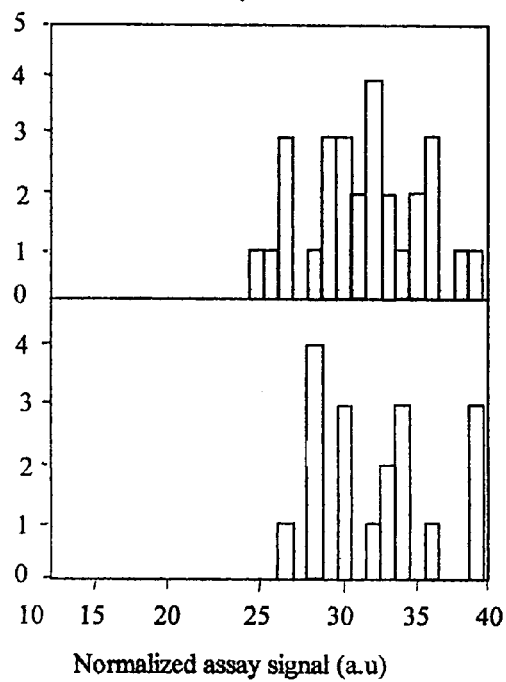
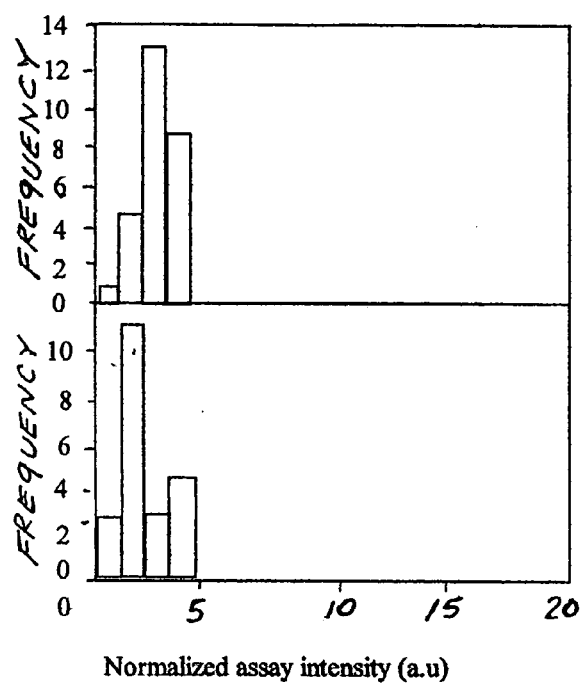
Fig 6C
Fig 6D

SEQUENCE LISTING

```
<160> NUMBER OF SEQ ID NOS: 7

<210> SEQ ID NO 1
<211> LENGTH: 88
<212> TYPE: DNA
<213> ORGANISM: Artificial Sequence
<220> FEATURE:
<223> OTHER INFORMATION: Artificial Target

<400> SEQUENCE: 1
tcagttttcc tggattatgc ctggcaccat taaagaaaat atcatctttg gtgtttccta      60
tgatgaatat agatacagaa gcgtcatc                                         88

<210> SEQ ID NO 2
<211> LENGTH: 17
<212> TYPE: DNA
<213> ORGANISM: Artificial Sequence
<220> FEATURE:
<223> OTHER INFORMATION: Probe

<400> SEQUENCE: 2
ccaaagatga tattttc                                                     17

<210> SEQ ID NO 3
<211> LENGTH: 18
<212> TYPE: DNA
<213> ORGANISM: Artificial Sequence
<220> FEATURE:
<223> OTHER INFORMATION: Probe

<400> SEQUENCE: 3
ataaccagga ggagttcg                                                    18

<210> SEQ ID NO 4
<211> LENGTH: 90
<212> TYPE: DNA
<213> ORGANISM: Artificial Sequence
<220> FEATURE:
<223> OTHER INFORMATION: Artificial Target
```

-continued

```
<400> SEQUENCE: 4
tcagttttcc tggattatgc ctggcaccat taaagaaaat atcatctttg gtgtttccta        60
tgatgaatat agatacagaa gcgtcatcaa                                        90

<210> SEQ ID NO 5
<211> LENGTH: 17
<212> TYPE: DNA
<213> ORGANISM: Artificial Sequence
<220> FEATURE:
<223> OTHER INFORMATION: Probe

<400> SEQUENCE: 5
ccaaagatga tattttc                                                      17

<210> SEQ ID NO 6
<211> LENGTH: 18
<212> TYPE: DNA
<213> ORGANISM: Artificial Sequence
<220> FEATURE:
<223> OTHER INFORMATION: Probe

<400> SEQUENCE: 6
ataaccagga ggagttcg                                                     18

<210> SEQ ID NO 7
<211> LENGTH: 14
<212> TYPE: DNA
<213> ORGANISM: Artificial Sequence
<220> FEATURE:
<223> OTHER INFORMATION: Probe

<400> SEQUENCE: 7
cccccccccc cccc                                                         14
```

IMMOBILIZATION OF BEAD-DISPLAYED LIGANDS ON SUBSTRATE SURFACES

RELATED APPLICATIONS

This Application claims priority to U.S. Provisional Application No. 60/478,011, filed Jun. 12, 2003.

BACKGROUND

Microarrays have become widely applied in proteomic and genomic analysis, as they permit multiplexed analysis of multiple analytes. See, e.g., Ramsay, *Nat. Biotechnol.* 16, 40-44 (1998); P. Brown, D. Botstein, *Nat. Genet.* 21, 33-37 (1999); D. Duggan, M. Bittner, Y. Chen, P. Meltzer, J. M. Trent, *Nat. Genet.* 21, 10-14 (1999); R. Lipshutz, S. P. A. Fodor, T. R. Gingeras, D. J. Lockhart, *Nat. Genet.* 21, 20-24 (1999). In a microarray, binding agents such as antibodies and/or oligonucleotides are spotted on planar substrates. These binding agents are then contacted with samples including complementary ligands (proteins or complementary oligonucleotides, as applicable) and permitted to bind or hybridize. The binding or hybridization is then detected. Because either the identity of the binding agents or the complementary ligands are known, by tracing their identity in the array, the complementary oligonucleotides or proteins can be determined. This is an effective method for identification or quantification of analytes in a sample.

The principal techniques of oligonucleotide array fabrication include: spotted arrays, and refinements of the original "spotting" in the form of pin transfer or ink jet printing of small aliquots of probe solution onto various substrates, as illustrated in V. G. Cheung, et al., *Nat. Genet.* 21, 15-19 (1999); sequential electrophoretic deposition of binding agents in individually electrically addressable substrate regions, as illustrated in J. Cheng, et al., *Nat. Biotechnol.*, 541-546 (1998); and methods facilitating spatially resolved in-situ synthesis of oligonucleotides, as illustrated in U. Maskos, E. M. Southern, *Nucleic Acids Res.* 20, 1679-1684 (1992); S. P. A. Fodor, et al., *Science* 251, 767-773 (1991) or copolymerization of oligonucleotides, as illustrated in A. V. Vasiliskov, et al., *BioTechniques* 27, 592-606 (1999). These techniques produce spatially encoded arrays in which the position within the array indicates the chemical identity of any constituent probe.

The reproducible fabrication of customized arrays by these techniques requires the control of microfluidics and/or photochemical manipulations of considerable complexity to ensure consistent performance in quantitative assays. Microfluidic spotting to produce, in quantitatively reproducible fashion, deposited features of 100 μm diameter involves dispensing of nanoliter aliquots with tight volume control, a task that exceeds the capabilities of currently available fluid handling methodologies. In addition, exposure of binding agents to air during the deposition process, typically several hours' in duration, has uncontrollable impact on the molecular configuration and the accessibility of the binding agents in subsequent binding assays. In-situ array synthesis relies on a sequence of multiple masking and photochemical reaction steps which must be redesigned to accommodate any changes in array composition. Finally, assay performance must be assessed "in-situ" for each array subsequent to immobilization of binding agents, an aspect of array manufacturing which raises difficult quality control and implementation issues.

As an alternative to solve many of the problems associated with spotted arrays, microbead particles bound to oligonucleotide probes have been used. See U.S. application Ser. No. 10/271,602, "Multiplexed Analysis of Polymorphic Loci by Concurrent Interrogation and Enzyme-Mediated Detection" filed Oct. 15, 2002; Ser. No. 10/204,799 "Multianalyte Molecular Analysis Using Application-Specific Random Particle Arrays," filed on Aug. 23, 2002, both being incorporated by reference. The beads are deposited on a substrate, and preferably affixed thereto, to form an array. Among the principal advantages are that the beads are encoded so that particular probes associated with particular beads can be determined by decoding. This obviates the need, associated with spotted arrays, to form arrays with particular probes in particular positions (spatial encoding).

Affixing the beads to the substrate is desirable because if they move about on the substrate, decoding signals cannot be localized and accurately interpreted. One of the advantages of a bead array is that the signal from the array and the decoding can be accomplished using an ordinary microscope. For example, a microscope can acquire a fluorescent signal from bound ligands in the array or can detect color differences which encode the beads. The array should be sized such that the entire array can be viewed in a single field, i.e., all at once, under the microscope.

One method of immobilizing beads involves confining them to wells in the substrate, where the wells are size-matched in diameter to the beads (i.e., only slightly larger than the beads). The height of the wells is preferably also about the same as that of the beads. FIG. 1 shows a cross-sectional view of a collection of beads in wells that function as mechanical traps. As long as the substrate faces upwardly, gravity inhibits the beads from escaping from the wells. However, forces produced by fluid transport, for example the combination of lateral and normal forces generated by the movement of an air-liquid interface over the substrate, can readily dislodge beads which are not adhered to the substrate. What is needed are compositions and methods to overcome such forces and permit consistent manufacture of arrays of immobilized beads.

By way of background, it is noted that the magnitude of the adhesion force between two solid surfaces depends on a number of factors, including surface chemistry, relative humidity, temperature, surface roughness, time of contact, nature of the material, and others. However, for two surfaces to establish adhesive contact, they must first approach each other closely. A number of colloidal forces control and modulate the approach of two surfaces. FIG. 2 shows the dependence of interaction energy (U) on separation for several commonly encountered forces. Each of these forces can be controlled by changing various parameters. For example, the long-range electrostatic repulsive force between two surfaces bearing charges of similar sign can be controlled by addition of salt, which screens the repulsive force, thereby permitting the two surfaces to come into closer proximity. In absence of screening, the equilibrium "contact" distance for a negatively charged polystyrene microparticle (several microns in diameter) from a charged flat surface like glass is on the order of 100's of nm, because the electrostatic repulsive forces which counteract gravity. Under such circumstances, particles remain sufficiently far from the surface so as to remain substantially unaffected by attractive interactions that operate at short length scales. It is noted, however, that ligand-receptor type interactions (for example, hybridization between complementary oligonucleotides) are attractive in nature and capable of operating at long length scales.

Capillary forces also can be very effective in bringing two surfaces close to each other. For example, the capillary force ($F_c$) between a rigid sphere of radius R and a flat surface has the functional form $F_c \sim 4\pi R\sigma \cos\theta$, where $\theta$ is the local contact angle, and $\sigma$ the interfacial tension of the liquid forming the capillary film. See Israelachvili, J. N. Intermolecular and Surface Forces, Academic Press, New York, 1985. For a wetting film, the large interfacial tension of the liquid leads to a correspondingly large value of $F_c$.

Once in contact, whether two surfaces will adhere is not solely determined by the net attraction between molecules. Bodies deform macroscopically in response to being placed in contact and hence the bulk contact geometry as well as material properties, such as elastic modulus and hardness, all affect the conformity and adhesion of one surface to another. According to JKR theory (Johnson, K. L, Kendall, K., Roberts, A. D. Surface Energy and the Contact of Elastic Solids. Proc. R. Soc. London A 1971, 324, 301) the variation of the radius of contact 'a' under applied load 'P' has the form $$a^3 = \frac{R}{K}\left[P + 3\pi RW + \sqrt{6\pi RWP + (3\pi RW)^2}\right]$$

where K denotes an elastic constant, $W \sim \sqrt{\gamma_1 \gamma_2}$, denotes the work of adhesion (where $\gamma_1$ and $\gamma_2$ are the surface energies of the two surfaces in contact) and R denotes the radius of curvature. In the absence of any applied load (P), the equilibrium contact radius is:

$$a = a_0 = \left[\frac{6\pi R^2 W}{K}\right]$$

The theory also predicts an adhesive contact force ($F_{adh}$):

$$F_{adh} = -\frac{3}{2}\pi RW$$

A large area of contact enhances adhesion, however it alone is not sufficient. For example, a wetting liquid achieves an excellent contact, but does not generate significant adhering force, because it does not resist shear deformation.

In reality, material surfaces are rough and hence are never in intimate contact. If the real area of contact is small, adhesion is weak. For rough surfaces, surface phenomena alone cannot account for the adhesion and many other macroscopic phenomena come into play, including, the degree of surface roughness, the maximal normal force applied to the contact, time for which the surfaces are in contact, bulk molecular structure and dynamics, and others. One of the early studies by Greenwood and Tripp (Greenwood, J. A., Tripp, J. H. The Elastic Contact of Rough Spheres. *J. Appl. Mech.* 1967 (March) 153-159) concluded that the effective initial contact area between rough surfaces is given by:

$$\alpha = \sqrt{2R\sigma_{roughness}}$$

where $\sigma_{roughness}$ is the root mean square of the surface asperities and R the bulk radius of curvature of the system (radius of the sphere for a sphere and flat system). A recent study by Quon et al. (Quon, R. A., Knarr, R. F., and Vanderlick, T. K. Measurement of the Deformation and Adhesion of Rough Solids in Contact. *J. Phys. Chem. B* 1999, 103, 5320-5327) concluded that systems that are in initial contact over an area with a radius greater than that predicted above are strongly adherent and ones with a smaller radius of contact are either weakly adherent or non-adherent. Thus, for rough solids, the adhesion improves with increasing initial loads. Under the influence of an increased initial load, asperities deform, permitting the surfaces to approach more closely and thereby permitting van der Waals attractions to contribute to adhesion.

In immobilizing bead arrays on silicon substrates (chips) for multiplexed analysis of multiple analytes, the immobilization must take place after completion of the array assembly process. Also, the immobilization protocol should not in any substantial manner affect the on-chip bioassays, i.e., it should, instead, preserve receptor moieties displayed on bead surfaces, leave binding kinetics unaffected and minimize non-specific binding.

SUMMARY

Disclosed are two different approaches for immobilization of beads on a substrate, one of which involves forming a bead-nanoparticle composite by cross-linking of the bead mixture with nanoparticles, and the other involving surface modification, using multi-layered polyelectrolytes.

In the first approach, an array of functionalized beads is assembled in a designated location (preferably in a depression or at another type of bead localization site, as described in Ser. No. 10/192,352, "Arrays of Microparticles and Methods of Preparation Thereof," filed Jul. 9, 2002) on a chip. Next, a droplet of nanoparticle suspension is introduced over the chip. The suspending solution is then allowed to evaporate for a pre-determined length of time, during which time the nanoparticles undergo extensive self-aggregation and adhere to beads as well as to the substrate surface. During incubation, care is taken to avoid complete evaporation of water, which will form a dry sintered film. After the incubation, the excess nanoparticle suspension is aspirated off and the surface of the chip cleaned by thorough scrubbing and washing. This removes the adhering nanoparticles from the exposed portions of the chip and the beads, but leaves behind the nanoparticles which are trapped between the bead and the substrate. The aggregated nanoparticles trapped between the beads and the substrate surface act to immobilize the beads in the wells. See FIG. 3. The concentration of the nanoparticle suspension and the incubation time are empirically optimized by measuring the efficiency of immobilization under the optimal washing conditions. See Example 1 below.

While this method is effective in immobilizing beads, a possible disadvantage is that there is an increase in nonspecific binding of analytes (e.g., oligonucleotides) to the nanoparticles. The nanoparticles accumulate around the beads in the wells, trapped between the beads and the well-wall, and this non-specific binding leads to a non-specific signal. The non-specific binding can be decreased by pre-treatment of the substrate with a polymer like polyethylene glycol ("PEG"), which coats the substrate and the nanoparticles, and thereby reduces nonspecific binding of the analytes. See Example 2.

Ultrathin surface films are routinely used to modify and/or add functionality to solid phase supports. Traditional chemisorption techniques usually require a reaction yield of 100% or extensive lateral crosslinking to establish and maintain a uniform film. A relatively new technique for growing ultrathin surface films is by successive deposition of alternating layers of cationic and anionic polyelectrolytes (Iler, R. K. J. Colloid Interface Sci. 1966,21,569; Decher, G., Hong, J. D. European patent number 0472 990 A2, 1992; Decher, G. Fuzzy "Nanoassemblies: toward layered polymeric multi-composites." Science 277, 1232, 1997). In this approach, electrostatic attraction adheres successive layers. Recently, there have been a few reports of use of oppositely charged polymer-nanoparticle systems for growing such multilayered films. See Sennerfors, T et al. Journal of Colloid and Interface Science, 254, 222-226 (2002); Serizawa, T. et al. Langmuir, 1998, 14, 4088-4094; Lvov, Y, et al. Langmuir 1997, 13, 6195-6203; Kotov, N. A. J. Phys. Chem. 1995, 99, 13065-13069.

This type of multilayer assembly is depicted schematically in FIG. 5A, and is performed as follows. A solid substrate with a negatively charged surface is immersed in a solution containing the cationic polyelectrolyte, and a layer of the polyelectrolyte is adsorbed. Since the adsorption is carried out at a high concentration, a number of the positive charges remain uncompensated at the interface and hence the surface charge is effectively reversed. After thorough rinsing in pure water, the substrate is immersed in a solution containing an anionic polyelectrolyte, and a layer of the polyanionic species is adsorbed. By repeating both steps in a cyclic fashion, multilayer assemblies with alternating cationic/anionic layers are formed.

Different designs of depressions are also disclosed, some of which are suitable for holding beads in place without any deposition of nanoparticles or polyelectrolytes.

A description of the drawing figures, and examples, along with a more detailed description, follow.

BRIEF DESCRIPTION OF THE DRAWINGS

FIG. 4 shows an evaluation of immobilization efficiency.

FIGS. 6A-6D show the hybridization assay results for multilayer polyelectrolyte modified chips. Depending on the trap size, either 2, 3 or 5 bilayers were deposited for immobilization. FIGS. 6A and 6C show the results for the specific signal and FIGS. 6B and 6D show the results of the nonspecific signal. FIGS. 6A and 6B are results from modified chips and FIGS. 6C and 6D represent results from control chips.

FIG. 8 shows the efficiency of the layer by layer method in holding beads in wells.

DETAILED DESCRIPTION

Figure 1:
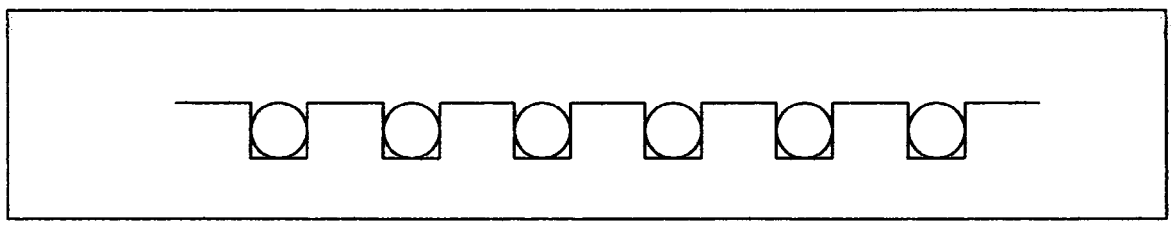
FIG. 1 schematically shows, in cross-section, one exemplary type of depression for localizing microparticles on a substrate.
Figure 2:
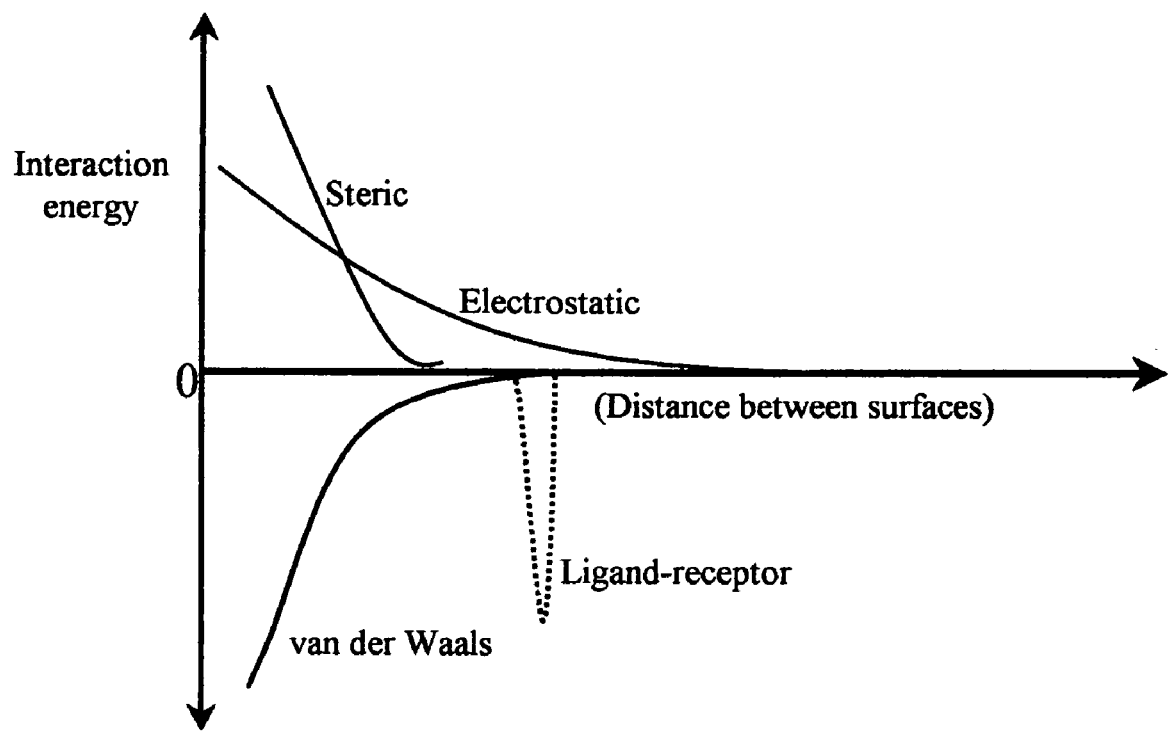
FIG. 2 shows the dependence of interaction energy (U) on separation for several commonly encountered forces.
Figure 3A:
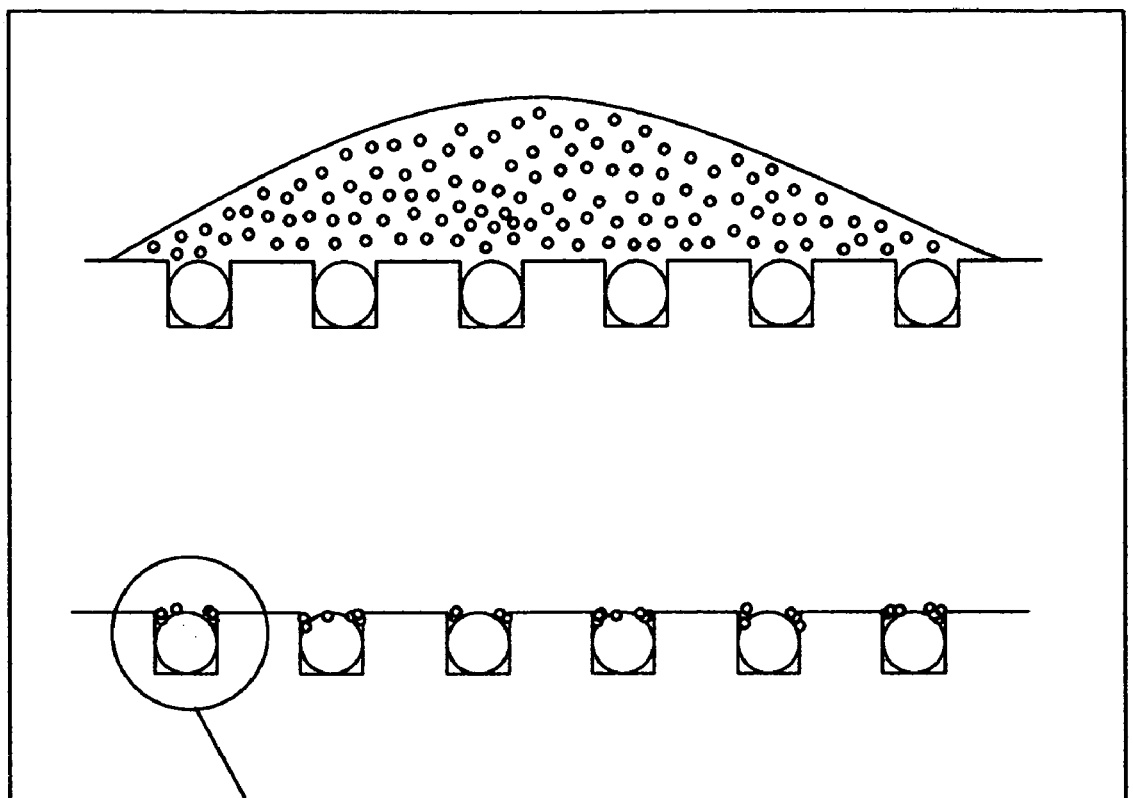
FIG. 3A shows a process flow chart for nanoparticle immobilization.
Figure 3B:
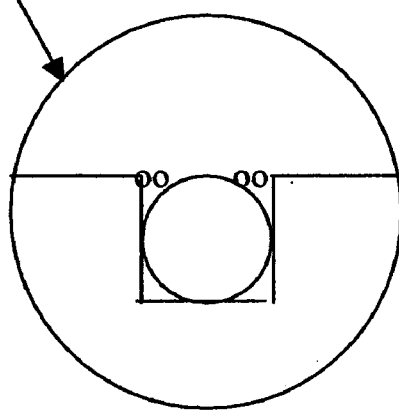
FIG. 3B is a cross-sectional view of a substrate including trapped beads in depressions.
Figure 7A:
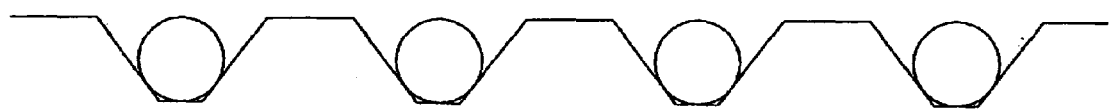
FIG. 7A to 7C show, in cross-section, three different exemplary structures for wells in a substrate.
Figure 7B:
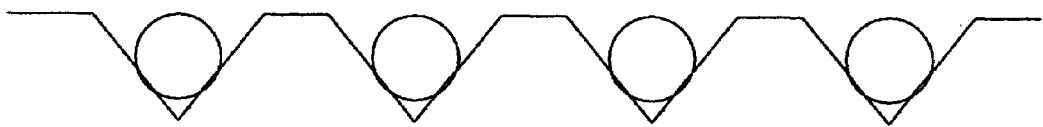
Figure 7C:
Figure 8A:
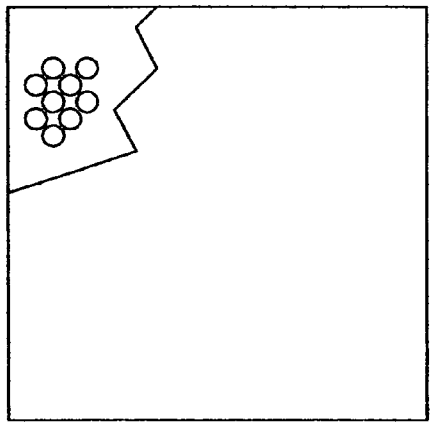
FIG. 8A depicts a plan view of an array of wells.
Figure 8B:
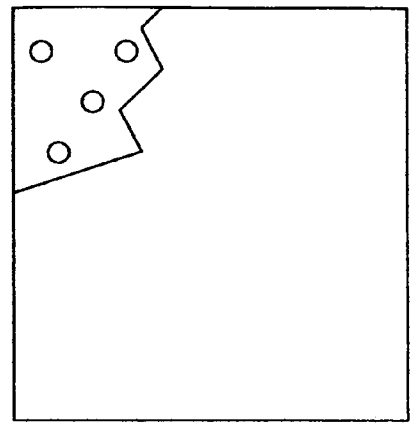
FIG. 8B depicts an image of a similar well array as in FIG. 8A after bead assembly and washing and no other treatment.
Figure 8C:
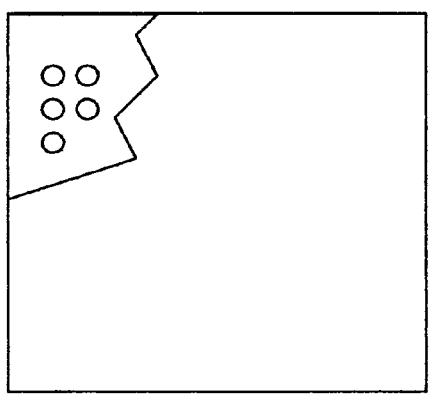
FIG. 8C depicts an image of a well array after bead assembly and washing for a chip coated with five polyelectrolyte bilayers.
Figure 8E:
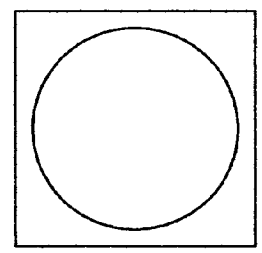
FIG. 8E is a plan view of a bead in a well.
Figure 8D:
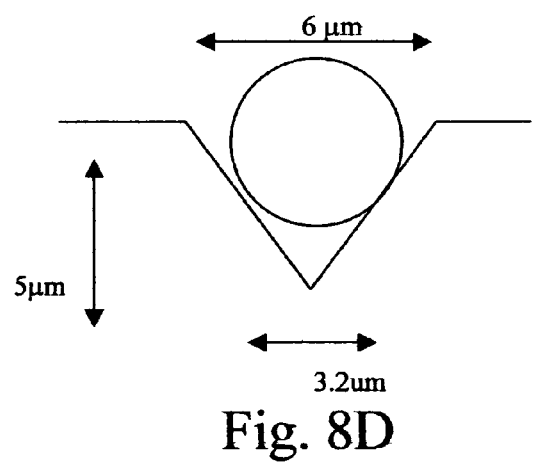
FIG. 8D shows the average approximate relative dimensions of a well and a bead as appearing in FIGS. 8A to 8C.

Turning first to FIG. 1, an exemplary set of depressions (holes) in a substrate are depicted, which are suitable for insertion of beads which display biomolecules. Assay analytes and reagents can be added over the surface of the substrate and will make contact with the beads and the biomolecules displayed thereon. FIGS. 7A to 7C depict three different designs for such depressions. In FIG. 7A, the holes narrow at the bottom to assist in holding the beads at the bottom of the holes. In FIG. 7B, the holes are cone-shaped to wedge in the beads. In FIG. 7C, the holes, in cross-section, are U shaped, and the beads can reside on either side of the hole.

Figure 9A:
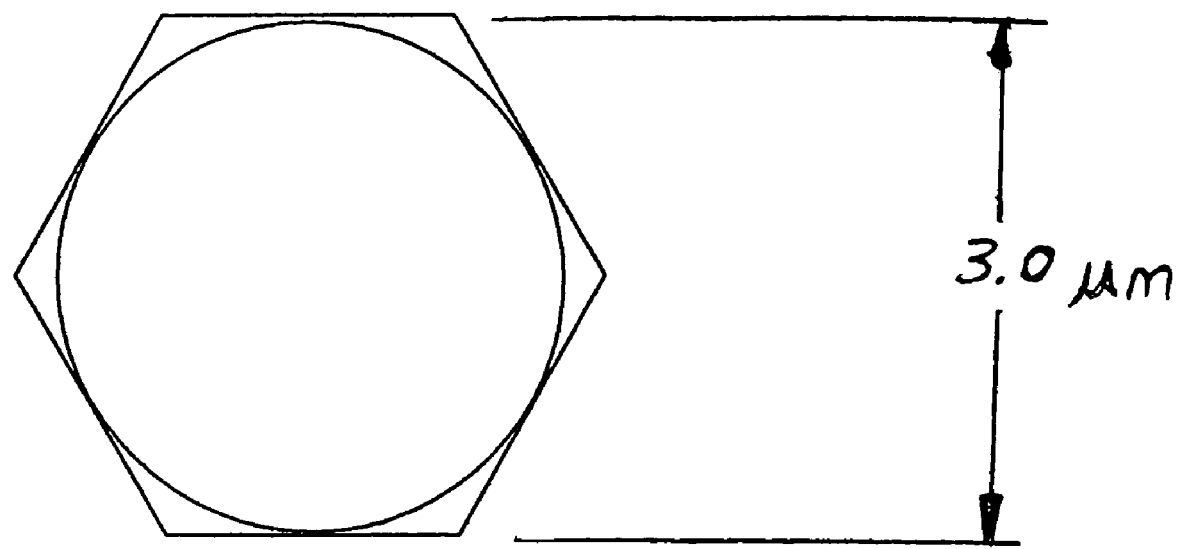
FIG. 9A depicts, in plan view, a design of a hole (or trap) for beads in a substrate, which is a "squeezed" hexagon, in which the space between two opposing sides is less than the bead diameter.
Figure 9B:
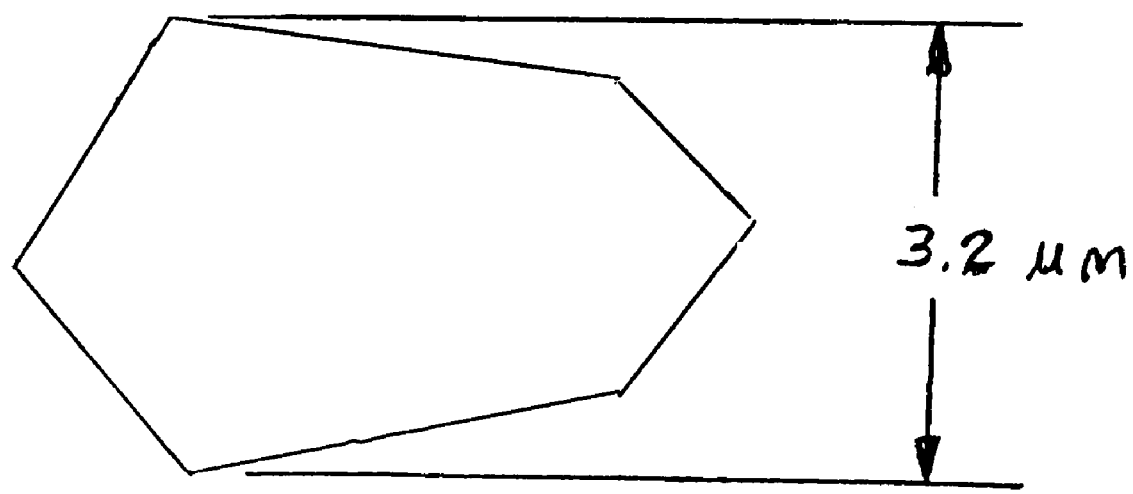
FIG. 9B depicts a design of a hole (or trap) for beads in a substrate, which is an asymmetric hexagon, where two opposing sides have a narrower space between them at one end than at the other, and are designed so that at the narrower edge, the space between the sides is less than the bead diameter.

FIGS. 9A and 9B depict two different designs for holes, which have areas which are narrower than the bead diameters. The beads are squeezed into the holes, and held in place by the resulting expansion force.

With any of the design of holes described herein, one can use additional techniques, including deposition of polyelectrolyte layers or a nanoparticle suspension, to hold beads in place in the holes. Examples of such techniques are set forth below. Alternatively, for depressions into which beads are wedged or squeezed, additional steps may not be required to hold the beads in place.

EXAMPLES

Example 1

Determination of Critical Concentration of Nanoparticles for Immobilization An experiment was designed to estimate the critical concentration of nanoparticles needed for particle immobilization in traps. For this experiment, an array of hexagonal traps of size 3.5 micron (side-to-side diameter) and a depth of 3.5 micron were made in a silicon substrate. 3.2 micron diameter latex particles coated with neutravidin protein were stained with a green fluorescent dye. The nanobead stock suspension was 80 nm silica particles at 34% by wt. (Snowtex-ZL, Nissan Chemicals, Houston, Tex.). Aliquots were taken from the nanoparticle stock and diluted with 10 mM Tris buffer (pH 8.0) containing 3%(v/v) glycerol to make desired concentrations. These diluted suspensions were then used to perform the experiments.

The beads were assembled on the substrate using the following protocol.

Example

Bead Assembly Protocol

An example of a processing procedure for forming bead arrays is as follows. Two microliters of 1% microparticles (approximately 3.2 micrometers in diameter) in 100 microliters of phosphate-buffered saline (also known as PBS: 150 mM, NaCl; 100 mM, Sodium phosphate, pH 7.2) were used for assembling microparticle arrays on individual silicon chips (1.75×1.75 mm) with microwells on each chip. The following procedures were used:

- Microparticles from PBS were collected in an 1.5 ml centrifuge tube by centrifugation (14,000 g, 1 minute). Other collection means may be used.
- The supernatant was discarded by aspiration using a transfer pipet.
- The particles were re-suspended in 5 microliters of 3% glycerol in 10 mM Tris pH 7.5.
- The particles were collected from the glycerol solution by centrifugation. Other collection means may be used.
- The glycerol solution was aspirated from the particle pellets.
- The pellets were re-suspended in 2 microliter of the 3% glycerol, 10 mM Tris, pH 7.5.
- Silicon chips pre-bonded to a glass microscope slide were taken.
- A 0.25 microliter volume of the particle suspension was pipetted onto each of the chips in the area including the microwells.
- The assembled chips were left in an enclosed chamber for a short period of time (e.g. 30 min) to allow the beads to settle down ands excess water to evaporate.
- After the incubation the droplet became more of a viscous slurry.
- A cotton applicator was washed with water from a wash bottle.
- The wet cotton applicator was dried using absorbant tissue paper to remove excess water. To assemble microparticle arrays, the bead slurry was gently stirred with the tip of the wet cotton applicator in a circular motion several times. The loose fibers of the cotton ball ferried the beads into the microwells on the surface.
- Following step above, the slide was centrifuged to promote the settling of the beads in the ( microwells) on the chip. The following materials and settings were used:
- Centrifuge: Sorvall centrifuge model RT6000B
- Rotor: Sorvall swing bucket model H1000B
- Speed: 2000 RPM
- Time: 5 min
- The particle occupancy of the microwells was examined by using a fluorescent microscope. If the occupancy is not satisfactory, the step above can be repeated.
- Excess particles were gently wiped away from the chip by using the cotton applicator. To avoid excess water on the surface, the cotton applicator was not pressed against the chip.
- The chip was dried by blowing on the surface of the chip with compressed nitrogen.
- The assembled microparticle prepared by this method can be used for assays or stored in solution at 4° C. for later use.

Figure 4A:
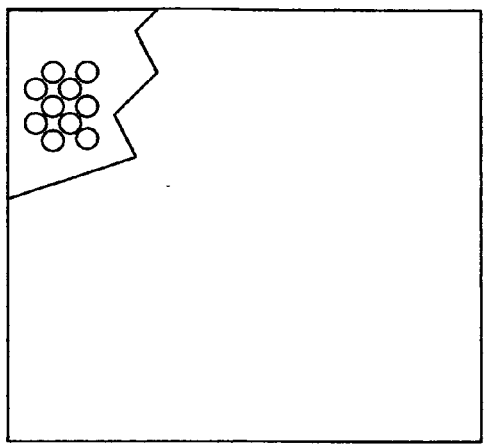
FIG. 4A depicts an array after assembly.
Figure 4B:
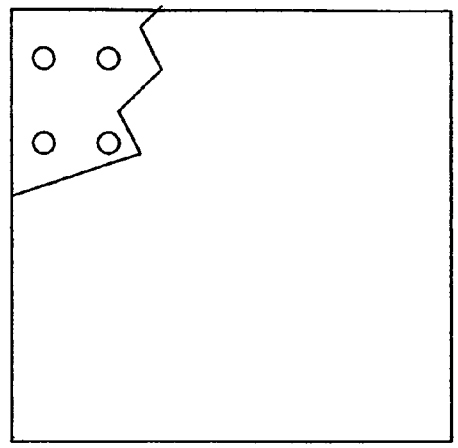
FIGS. 4B, 4C and 4D show arrays following the application of shear forces, FIG. 4B without any nanoparticles, FIG. 4C with insufficient nanoparticle concentration (0.4% (w/v)) and FIG. 4D with sufficient nanoparticle (1.0% (w/v)) to effect immobilization. The nanobeads employed for this experiment were ~80 nm diameter silica particles and the microparticles were Neutravdin functionalized green fluorescent particles (3.2 μm diameter).
Figure 4C:
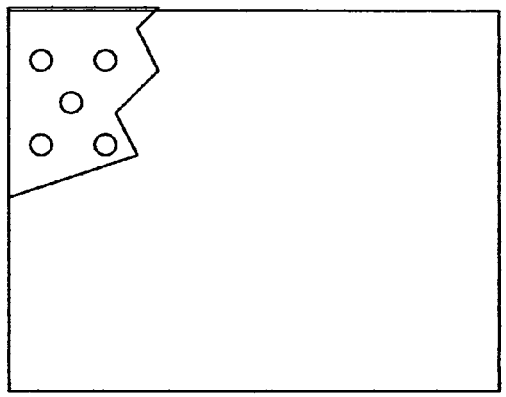
Figure 4D:
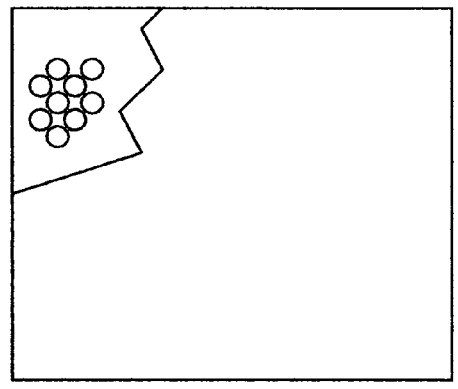

Following assembly, the occupancy of the traps was checked by fluorescence microscopy. See FIG. 4A. Next, a 2 µl droplet of the nanoparticle suspension was used for immobilization, by placing it on the substrate (having dimensions of 1.75 mm×1.75 mm) and incubating at 30° C. and 30% relative humidity for 30 minutes. The selected incubation conditions avoided complete evaporation, which leads to the formation of an undesirable dry sintered film. After the incubation was over, the excess nanoparticle suspension was aspirated off and the surface of the chip was cleaned by thorough scrubbing and washing. The occupancy of the traps was checked again using fluorescence microscopy. The results are shown in FIGS. 4B to 4D.

Example 2

Assay Results on Polymer Blocked Nanoparticle Immobilized Chips

The bead assembly was carried out as described in Example1 using a 1% nanoparticle solution. The polymer blocking solution used for this study was 1% (w/v) PEG 20,000 dissolved in 10 mM Tris with 3% (v/v) glycerol. Following the particle assembly and immobilization using the nanoparticle suspension, 15 µl of the polymer solution was added to each chip, which were stored in a humid chamber at 4° C. overnight. For performing the assay, first the excess polymer solution was removed from the chip surface and the chip was washed with de-ionized water.

A hybridization assay was performed using a 90-nt Cy5 labeled polynucleotide target. Two microliters of a 10 µM solution of a synthetic target (5'-Cy5 dye- coupled to the oligo:TCAGTTTTCCTGGATTATGCCTGGCAC-CATTAAAGAAAATATCA TCTTTGGTGTTTCCTAT-GATGAATATAGATACAGAAGCGTCATCAA-3' (SEQ ID NO. 1)) in de-ionized water was diluted with 18 µl of 1×TMAC (4.5 M tetramethyl ammonium chloride, 75 mM Tris pH 8.0, 3 mM EDTA, 0.15% SDS) to a final volume of 20 µl. Two types of oligonucleotide-functionalized fluorescent microparticles were assembled into planar arrays on silicon chips, using the protocol set forth above. The first microparticle type was functionalized with a matched probe sequence (SEQ ID NO.2) 5'-Amino/(TEGspacer)/CCAAAGAT-GATATTTTC/-3' ("TEG" is triethylene glycol). The second microparticle type was functionalized with a mismatched probe sequence (SEQ ID NO. 3): Amino/(TEGspacer)/ATAACCAGGAGGAGTTCG/-3'). Twenty microliters of the synthetic target was added to the substrate surface and the substrate was placed in a 55° C. heater for 20 minutes. The substrate was then removed from the heater and the target solution was aspirated. The substrate was washed three times with 1×TMAC at room temperature. Following this, 10 µl of 1×TMAC was placed on the substrate surface, it was covered with a glass cover-slip and the fluorescence intensity of the array was recorded using fluorescence microscopy.

The control assays were done with chips without any added nanoparticle or polymer. In the unoccupied traps in the control assay, there is some non-specific binding of target in the traps. The results are shown in Table 2 and 3, where CV is the coefficient of variation.

TABLE 2

Results on polymer blocked nanoparticle immobilized chips

| Chip# | Matched probe signal | Mismatched probe signal | Ratio | Unoccupied traps |
|---|---|---|---|---|
| 1 | 9603 | 783 | 12.26 | 558 |
|   | CV 8% | CV 36% |   | CV 20% |
| 2 | 11,902 | 695 | 17.12 | 545 |
|   | CV 5% | CV 24% |   | CV 21% |
| 3 | 10,264 | 731 | 14.04 | 539 |
|   | CV 10% | CV 30% |   | CV 18% |
| 4 | 10,631 | 1058 | 10.04 | — |
|   | CV 11% | CV 33% |   |   |

TABLE 3

Results on uncoated (control) chips

| Chip # | Matched probe signal | Mismatched probe signal | Ratio | Unoccupied traps |
|---|---|---|---|---|
| 1 | 12,958 CV 7% | 790 CV 31% | 16.4 | 613 CV 39% |
| 2 | 12,343 CV 6% | 841 CV 28% | 14.67 | 745 CV 29% |

The immobilization protocol along with the polymer blocking step preserved the signal for the matched probes (~10% drop in the specific assay signal), and decreased the non-specific signal from the chip surface (~20%), while the signal from binding of the mismatched probes was essentially unaffected.

Example 3

Fabrication of Multiple Polyelectrolyte Bilayers on a Chip

Figure 5A:
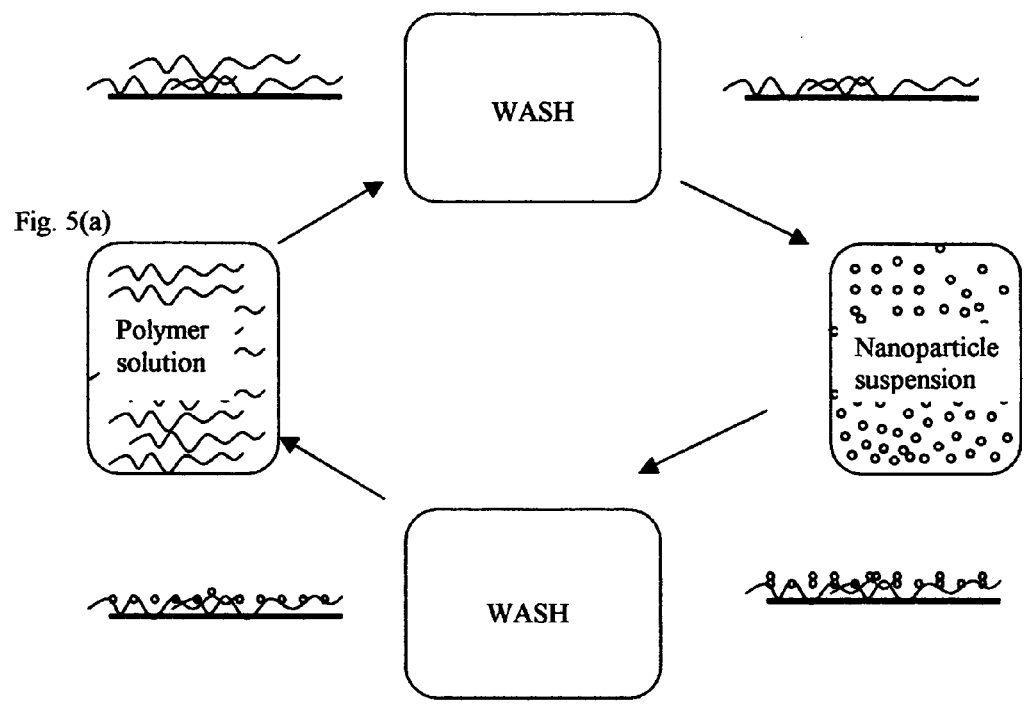
FIG. 5A shows the process flow for deposition of the polyelectrolyte bilayer structure.
Figure 5B:
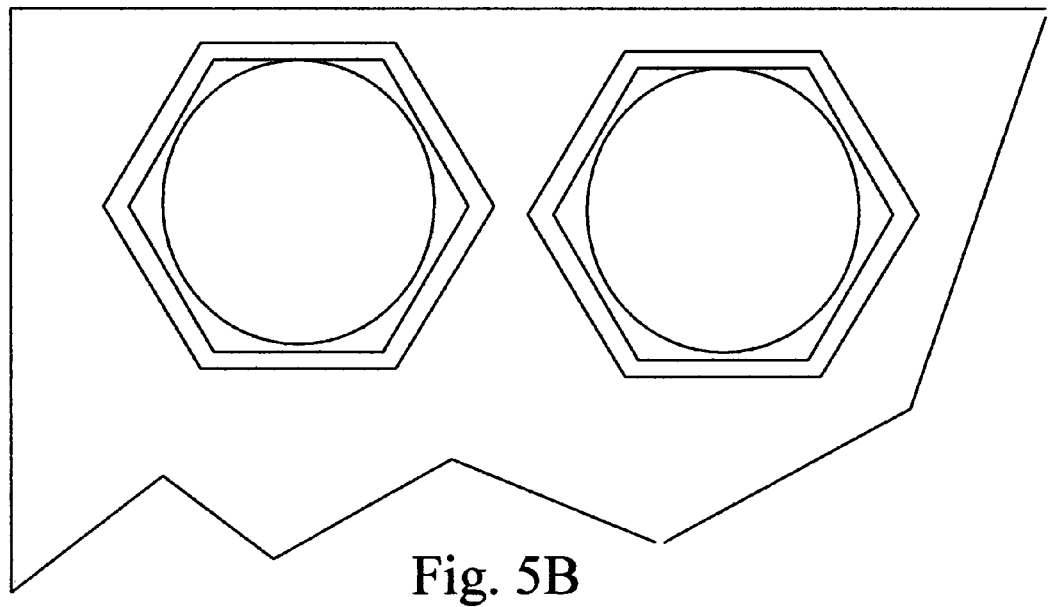
FIG. 5B depicts an array of polyelectrolyte coated traps, on which 10 bilayers were deposited. A nanocomposite film is deposited on the trap walls and there is an absence of coating on the exposed bead and chip surface.

A negatively charged chip (a silicon substrate coated with a layer of silicon dioxide) was immersed in a cationic polyelectrolyte solution (a 1% w/v solution of polyallylamine hydrochloride, having Mol. Wt. 15,000, made by Aldrich Chemicals, Milwaukee, Wis., in 1M calcium chloride) for 2 minutes. The chip was then taken out and thoroughly washed with de-ionized ultra filtered water and put back in a 3.4% (w/v) solution of negatively charged (ξ potential 56 mV at 1 mM ionic strength and at pH ~4.0) 22 nm Ludox silica nanoparticles (Aldrich Chemicals, Milwaukee, Wis.) in PBS (0.1M Sodium Phosphate, 0.15M Sodium Chloride, pH 7.2) and incubated for 2 minutes. Following this, the chip was taken out and again thoroughly washed with de-ionized ultra filtered water. This treatment resulted in the formation of a bilayer structure as shown in FIG. 5(a). Subsequent bilayers can be deposited similarly by alternately exposing the chip to cataionic/anionic polyelectrolyte solutions. FIG. 5(b) shows an array of traps coated with ten bilayers.

Example 4

Critical Number of Bilayers Needed for Immobilization

An experiment was devised to investigate the minimum number of bilayers needed for immobilization of beads in the traps. Three different trap sizes were chosen for this study (see Table 4). All experiments were performed with 3.2 μm oligo-functionalized beads. The calculated trap size and the difference between the trap size and the bead size (mismatch) is shown in Table 4.

TABLE 4

Dimensions and size mismatch for various trap sizes

| Chip# | Trap size (microns) | Mismatch (nm) |
|---|---|---|
| 1 | 3.5 | 300 |
| 2 | 3.4 | 200 |
| 3 | 3.3 | 100 |

The bilayer coating was carried out as described above in Example 3. Table 5 shows the results for the various trap sizes. For a larger mismatch between the bead and the trap size, more bilayer-coatings are needed for immobilization.

TABLE 5

Minimum number of bilayers needed for immobilization

| Chip # | Trap size (microns) | Expected layer thickness (nm) | 1 | 2 | 3 | 4 | 5 |
|---|---|---|---|---|---|---|---|
| 1 | 3.5 | 200 | | | | ■ | ■ |
| 2 | 3.4 | 120 | | | ■ | ■ | ■ |
| 3 | 3.3 | 80 | | ■ | ■ | ■ | ■ |

*the cells with grey color indicate where the immobilization was effective.

Example 5

Assay Results on Bilayer Coated Chips

Several chips were coated with the minimum number of bilayers needed for immobilization as described in Example 3. Following the coating, the beads were assembled into the traps, as in Example I, and the surface of the chip was scrubbed clean with a damp cotton applicator. This step removes the bilayer film from the exposed part of the chip but leaves the film on the trap walls, which helps to retain the beads in the traps (see FIG. 5).

DNA hybridization assays were carried out as described in Example 2. Two microliter of a 10 μM solution of a synthetic target (5'-Cy5 labeled TCAGTTTTCCTGGATTATGCCTG-GCACCATTAAAGAAAATATCATCTTTGGTGTT TCCTATGATGAATATAGATACAGAAGCGTCATCAA-3' (SEQ ID NO. 4)) in de-ionized water was diluted with 98 μl of 1×TMAC (4.5 M tetramethyl ammonium chloride, 75 mM Tris pH 8.0, 3 mM EDTA, 0.15% SDS) to a final volume of 20 μl. Two types of oligonucleotide-functionalized fluorescent microparticles were assembled into planar arrays on silicon chips using a protocol as described above. The first microparticle type was functionalized with a matched probe sequence 5'-Amino/(TEGspacer)/CCAAAGATGATATTTC/-3' (SEQ ID NO. 5). The second microparticle type was functionalized with a mismatched probe sequence Amino/(TEG-spacer)/ATAACCAGGAGGAGTTCG/-3' (SEQ ID NO. 6). Twenty microliters of the synthetic target was added to the substrate surface and the substrate was placed in a 55° C. oven for 20 minutes. The substrate was then removed from the oven the target solution was aspirated. The substrate was washed three times with 1×TMAC at room temperature. Following this, 10 μl of 1×TMAC was placed on the substrate surface, covered with a glass cover-slip and the fluorescence intensity of the array was recorded. The results are shown in FIG. 6. The matched or the specific signal was unaltered but the non-specific signal was increased two fold, most likely because of non-specific binding to the coated substrate.

Example 6

Suppression of Non-Specific Signal on Polyelectrolyte Coated Chips

Polyelectrolyte bilayer coated chips were fabricated as described in Example 5, but after the last exposure to Ludox solution, two additional bilayers were added, using Polyallylamine solution and a solution of 1% (w/v) Polyacrylic acid, sodium salt (Mol. Wt. 8,000, Aldrich Chemicals, Milwaukee, Wis.) in 1M calcium chloride. After the final polyacrylic acid deposition the chip was washed thoroughly with de-ionized ultra-filtered water and incubated at 120° C. for 2 hours. Beads were assembled on these coated chips as described before and hybridization assay was carried out as described in Example 5. In some of the assays, in addition to the two types in Example 5, a third type of functionalized bead with a mismatched probe sequence Amino/(TEGspacer)/CCCCCCCCCCCCCC/-3 (SEQ ID NO. 7), was also used.

TABLE 6 with % CV

| Chip# | Specific signal | Non-specific signal_1 | Non-specific signal_2 (another probe) | Unoccupied traps |
|---|---|---|---|---|
| Chip_1 | 5555 (10%) | 186 (26%) | 200 (25%) | 184 (24%) |
| Chip_2 | 5553 (14%) | 224 (30%) | 237 (30%) | 186 (37%) |
| Chip_3 | 5593 (14%) | 222 (34%) | 237 (34%) | 174 (31%) |
| Chip_4 | 5780 (14%) | 247 (22%) | 263 (22%) | 239 (24%) |

TABLE 6-continued with % CV

| Chip# | Specific signal | Non-specific signal_1 | Non-specific signal_2 (another probe) | Unoccupied traps |
|---|---|---|---|---|
| Chip_5 | 5800 (10%) | 214 (22%) | — | 214 (27%) |
| Chip_6 | 5542 (10%) | 251 (23%) | — | 207 (24%) |
| Chip_7 | 5573 (10%) | 270 (22%) | — | 240 (16%) |
| Chip_8 | 5398 (10%) | 280 (24%) | — | 210 (26%) |
| Control_1 | 5600 (10%) | 210 (20%) | — | 186 (30%) |
| Control_2 | 5800 (10%) | 240 (24%) | — | 216 (25%) |

It should be understood that the terms, expressions, examples and embodiments depicted above are exemplary only and not limiting, and that the scope of the invention is defined only in the claims which follow, and includes all equivalents of the subject matter of the claims.

What is claimed is:

1. A method of affixing an array of microparticles in a series of recesses in a substrate surface, comprising:
   placing microparticles in said series of recesses in a manner such that one microparticle resides in any one recess;
   placing a nanoparticle suspension on the substrate surface over said series of recesses having microparticles therein;
   incubating the nanoparticle suspension with the microparticle containing substrate whereby numerous nanoparticles get deposited and wedged between the microparticle and the walls of the recess in which it resides.

2. The method of claim 1 wherein the incubation period is chosen such that at the end of the incubation evaporation does not substantially remove liquid from the substrate surface so as to create a nanoparticle coating.

3. The method of claim 1 wherein the substrate surface is further coated to inhibit non-specific binding of oligonucleotide compounds which contact with the substrate.

4. The method of claim 3 wherein the coating is a polymer.

5. The method of claim 4 wherein the polymer is PEG 20,000, applied by first dissolving it in 10 mM Tris with 3% (v/v) glycerol.

6. The method of claim 1 wherein the microparticle is housed in a depression.

7. The method of claim 6 wherein the recesses depression is a cylindrical hole of slightly larger inner diameter than the outer diameter of the microparticle, or is a hole with inwardly tapered sides and the inner diameter of the opening is large enough such that the microparticle can be housed within the depression.

8. The method of claim 1 wherein the microparticle consists of a polymer.

9. The method of claim 8 wherein the polymer is latex.

10. The method of claim 1 wherein the microparticle is functionalized with a protein.

11. The method of claim 10 wherein the microparticle is functionalized with an oligonucleotide.

12. The method of claim 10 wherein the protein is neutravidin.

13. The method of claim 1 wherein the nanoparticle consists of silica, which is suspended in an aqueous glycerol solution.

14. The method of claim 1 wherein the substrate has a plurality of depressions, and each accommodates one microparticle.

15. The method of claim 1 wherein most of the nanoparticles deposited in any particular recess are deposited in the gap between the curved surface of the microparticle nearer to the substrate surface and the opposing portion of such recess wall.

16. The method of claim 1 wherein following incubation, the excess nanoparticle suspension is removed and the surface of the substrate cleaned by thorough scrubbing and washing.

* * * * *